(12) United States Patent
Murphy et al.

(10) Patent No.: US 6,856,943 B2
(45) Date of Patent: Feb. 15, 2005

(54) USER PERCEPTION TOOL

(75) Inventors: Stephen F Murphy, Bray (IE); Emma K Gottesman, Dublin (IE); John A Moore, Carrigaline (IE); Massimo Buffo, Dublin (IE); David C Tracey, Drogheda (IE); Brian J Gillespie, Dublin (IE)

(73) Assignee: Sun Microsystems, Inc., Santa Clara, CA (US)

(*) Notice: Subject to any disclaimer, the term of this patent is extended or adjusted under 35 U.S.C. 154(b) by 83 days.

(21) Appl. No.: 10/106,405

(22) Filed: Mar. 26, 2002

(65) Prior Publication Data

US 2003/0187617 A1 Oct. 2, 2003

(51) Int. Cl.$^7$ ................................................ G06F 11/30
(52) U.S. Cl. ...................... 702/186; 702/122; 702/187; 702/188; 709/224; 711/113; 717/106
(58) Field of Search ................................ 702/182, 186, 702/187; 714/35, 48; 705/36; 707/10; 709/108, 223, 224, 318; 716/6; 703/21, 27

(56) References Cited

U.S. PATENT DOCUMENTS

| | | | | |
|---|---|---|---|---|
| 5,440,719 A | * | 8/1995 | Hanes et al. ................... | 703/21 |
| 6,253,282 B1 | * | 6/2001 | Gish ........................... | 711/113 |
| 6,438,592 B1 | * | 8/2002 | Killian ....................... | 709/224 |
| 6,446,028 B1 | * | 9/2002 | Wang ......................... | 702/186 |
| 6,622,290 B1 | * | 9/2003 | Ginetti et al. ................. | 716/6 |
| 2002/0165954 A1 | * | 11/2002 | Eshghi et al. ................ | 709/224 |
| 2002/0184363 A1 | * | 12/2002 | Viavant et al. ............. | 709/224 |
| 2003/0023952 A1 | * | 1/2003 | Harmon, Jr. ................. | 717/106 |

OTHER PUBLICATIONS

Gottesman, Emma; *Relating User Perception of Performance to Measurable System Parameters*; SunSoft Tech-Conf 2001, pp. 1–14.

Sun Microsystems, Inc.; *Using Latency to Infer User Perception of Performance*; Apr. 2002, pp. 1–29.

Sun Microsystems, Inc.; *Latency and User Perception*; May 2002, pp. 1–39.

* cited by examiner

*Primary Examiner*—John Barlow
*Assistant Examiner*—John Le
(74) *Attorney, Agent, or Firm*—Martine, Penilla & Gencarella, LLP

(57) ABSTRACT

The present invention provides a method and apparatus for measuring performance of a computer system. The method includes generating a first setpoint, generating an event, timing at least a portion of the event, comparing the timed portion of the event with the first setpoint, and producing an indication of undesirable performance in response to the timed portion of the event being greater than the first setpoint. The apparatus includes a storage unit adapted to store a user perception tool, and a control unit adapted to execute the user perception tool, wherein the user perception tool causes the control unit to measure latency of a computer system and infer from the latency a user perception of performance.

15 Claims, 3 Drawing Sheets

USER PERCEPTION TOOL

BACKGROUND OF THE INVENTION

1. Field of the Invention

This invention relates generally to improving the performance of a computer system, and more particularly, to measuring latency on servers with various loads to infer user perception of performance.

2. Description of the Related Art

In general, a computer network is an interconnection of computer systems and other devices for facilitating the transfer of data and commands between and among the computer systems and network devices making up the network. One type of computer network, generally referred to as a client-server network, is used extensively in both local area networks ("LANs") and worldwide networks, such as the Internet. In a client-server network, several client computer systems are generally connected to a common server computer system through one of a variety of network connections. Users of this type of network may communicate with the network via the client systems. Furthermore, applications that are resident in the various client computer systems typically establish some sort of association with a single server system. With such an arrangement, the client applications may exchange commands and data with the associated server system.

By way of example, a user may be utilizing an application on a client system that provides world wide web ("WWW") browsing capabilities. When the user wishes to print a web page (i.e., a document from the WWW), for example, the WWW browser application may send the web page and a print command over the network to the server system. In one embodiment, the server system may then direct a printer, which might be connected to the server system, to print the web page.

One type of client-server network is known as "thin client technology." The term "thin client technology" generally refers to a solution where networked personal computers are centrally-managed from a main file server. All applications are stored centrally on the file server (as opposed to being stored on each client system), thereby eliminating the need for installing and administering applications on individual workstations. Furthermore, in a thin client system, only the central file server is generally maintained and upgraded, thereby reducing the costs of ownership. A thin client workstation typically sends the user's keystrokes and mouse clicks to the main server, where interaction with the application takes place. The main server may send graphical data to the client, where it is displayed on the client monitor, for example. The server may also send audio data to the client, where it may be heard on a speaker system, for example. The main server and client systems create a distributed computing environment, sharing time and resources of the main server among the client systems. In a thin client system, the client computer is typically devoid of CD-ROM players, diskette drives, and expansion slots. In other words, the client computer acts like a traditional "dumb" terminal, simply serving as an input/output interface to the main server.

With such a client-server arrangement, several potential flaws may arise. For example, the server system may fail, leaving the client systems without any access to the server system. In another example, the server system may not have sufficient performance (e.g., memory) to provide acceptable service to all of its clients. A lack of sufficient performance may be a result of having too many users (i.e., a high load) on a server system. In the past, when computer resources were more limited, computer users may have been more accustomed to sharing processing power and other computing resources. There was generally more tolerance for excess latency periods. However, a plurality of people today have their own computer. A personal computer generally has one or more processors dedicated to personal computing and is typically optimized to control user-perceived latency times. Therefore, computer users today may not tolerate latency times on client systems in excess of what their desktops provide. As a result, there is a demand for an accurate and optimal method of measuring server system performance to predict user-tolerance of a server system with a particular load.

Performance of a server system is traditionally measured through the use of benchmarks. A benchmark is a standardized test used to measure the performance of a computer system. The benchmark usually compares the performance of one computer system against the performance of others. Benchmarks are used regularly by computer magazines to compare the performance of various computer systems. Although many early benchmarks concentrated on hardware performance of the computer system, such as processor performance, there has been a trend in recent years towards measuring the performance of high-speed networks. A plurality of benchmarks now test network performance. Popular network performance benchmarks include Netperf, Network Protocol Independent Performance Evaluator ("NetPIPE"), and Ziff Davis Media's® NetBench® benchmark.

Although benchmarks are a popular way to compare and measure network performance, they do have their limitations. For example, benchmarks are typically system-dependent. Generally, benchmarks are useful only if they are specific to the network system, the applications, and the set of data that a particular user may use. If the computer system changes, the benchmark performance may change too. For example, a network system with a certain amount of random access memory ("RAM") may not execute a particular application as efficiently as the same network system with twice as much RAM. As a result, a network benchmark may need to be executed a plurality of times to determine the performance of various network systems with different hardware configurations. Furthermore, network performance may change with additional users. Because it is difficult to predict how a particular user may utilize the network system resources, current network benchmarks do not provide an accurate method of testing the additional load on a network system caused by additional users. For example, although one user may be using the network system mainly to check e-mail, another user may be using the network system to download and play streaming audio and video files. The additional load on the network system caused by the user who downloads and plays streaming audio and video files may not be anticipated by running a benchmark for an "average" user. As a result, a server administrator, for example, may authorize additional users, which may inadvertently overburden the system and cause network performance problems, such as low throughput and high latency periods.

As mentioned, computer users today are accustomed to their fast personal computers at home, and generally, do not tolerate long latency periods on time-shared network systems. As a result, there is a need to accurately measure latency periods to determine whether such latency periods are tolerable to users. Although attempts have been made to measure congestion and efficiency over computer networks, none operate well over a wide range of network conditions.

SUMMARY OF THE INVENTION

In one aspect of the present invention, a method is provided for measuring performance of a computer system. The method comprises generating a first setpoint, generating an event, timing at least a portion of the event, comparing the timed portion of the event with the first setpoint, and producing an indication of undesirable performance in response to the timed portion of the event being greater than the first setpoint.

In another aspect of the present invention, an apparatus is provided for measuring performance of a computer system. The apparatus is comprised of a storage unit adapted to store a user perception tool, and a control unit adapted to execute the user perception tool, wherein the user perception tool causes the control unit to measure latency of a computer system and infer from the latency a user perception of performance.

BRIEF DESCRIPTION OF THE DRAWINGS

The invention may be understood by reference to the following description taken in conjunction with the accompanying drawings, in which like reference numerals identify like elements, and in which.

Figure 1:
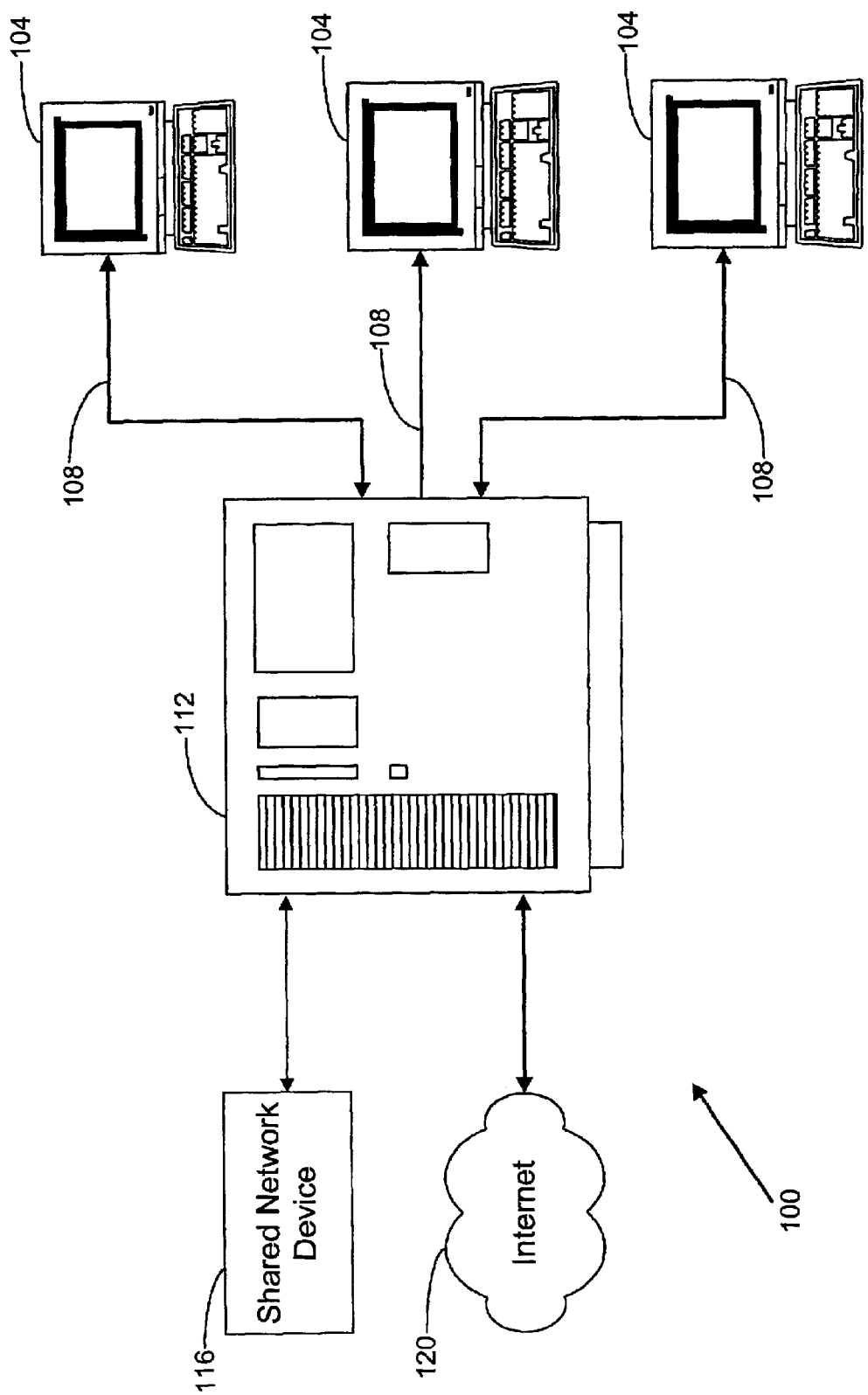
FIG. 1 illustrates a block diagram of a computer system programmed and operated in accordance with one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but, on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Turning now to FIG. 1, one embodiment of a client-server system 100, in accordance with the present invention, is illustrated. A plurality of client computers, collectively identified with reference numeral 104, enable users to communicate via a network, collectively identified with reference numeral 108, with a server computer 112. The network 108 may comprise one of a variety of topologies in accordance with conventional practice, such that the client computer 104 and the server computer 112 may communicate with each other.

In the context of this disclosure, the term "computer" is used to refer to any type of data processing device comprising one or more processors, which are capable of executing digitally programmed instructions. The term "client computer" refers to any computer capable of connecting to the server computer 112 on the network 108 and performing any of a variety of functions with the server computer 112, in accordance with conventional practice. In one embodiment, the client computer 104 may be a general purpose computer capable of performing a plurality of functions similar to a stand-alone processor-based system. In an alternate embodiment, the client computer 104 may be a dedicated computer designed for a specific task, such as web browsing and customer resource management. Although in the illustrated embodiment a thin client-server system 100 is shown, it should be appreciated that the present disclosure may apply to any client-server system with a distributed computing environment. An example of a client computer for use on the client-server system 100 is a Sun Ray® appliance of Sun® Microsystems, Incorporated. It should be appreciated that a client computer can also be a wide range of other network-connectable computing devices such as personal digital assistants ("PDAs"), text messaging pagers, cellular phones, advanced digital game machines, digital set top boxes for televisions, and even processor-based household appliances. The term "server computer" refers to any type of data processing device that is connected to a node on a network for providing services to client devices on the network. An exemplary server computer for use on the client-server system 100 is a Sun Fire® server of Sun® Microsystems, Incorporated.

In the illustrated embodiment, the client computer 104 comprises one or more output devices (not shown) and one or more input devices (not shown). It should be appreciated that the client computer 104 may comprise a wide range of output devices, including monitors, flat-panel displays, liquid-crystal displays, speakers, and the like. It should also be appreciated that the client computer 104 may comprise a wide range of input devices, including a keyboard, mouse, tablet, touch-sensitive surface, digital pen, joystick, microphone, game pad, and the like. Although not illustrated, the input and output devices may communicate to the server computer 112 via a server input/output interface (described in greater detail below). Furthermore, the server computer 112 may communicate to the client computer 104 via a client input/output interface (described in greater detail below).

The server computer 112 may be coupled to one or more shared network devices 116, in accordance with conventional practice. Exemplary shared network devices 116 include, but are not limited to: compact disc read-only memory ("CD-ROM") drives, digital video disc ("DVD") drives, optical drives, tape drives, hard disk drives, ZIP® drives, routers, printers, fax machines, audio devices and video devices. In one embodiment, the shared network device 116 may be connected to the network 108 via the server computer 112. Among other things, the server computer 112 provides the users of the network 108 (i.e., users of the client computers 104) with access to the resources of the network 108, such as the shared network device 116. In a typical implementation, the server computer 112 and the shared network device 116 are capable of unicast (i.e., point-to-point) or multicast communications over the network 108 using a common network communication mechanism such as the Transmission Control Protocol/Internet Protocol ("TCP/IP") running under an operating system such as Microsoft Windows®, Apple Mac OS®, UNIX®, and Solaris®.

Those skilled in the art will recognize that the shared network device 116 may be any type of device that is attached to a computer network 108. Each of these shared network devices 116 typically includes a conventional network interface device such as a network interface card ("NIC") (not shown), which interfaces the network devices 116 directly to the server computer 112 without the need for a dedicated server. Among other things, the NICs may gather information about device usage, status, jobs, and the like. In addition, the NICs may provide device-specific services such as job buffering and spooling, as well as management functionality to the associated network devices 116. The server computer 112 may also be connected to other networks, including the Internet 120, thereby creating a vast network comprising a multitude of devices.

Figure 2:
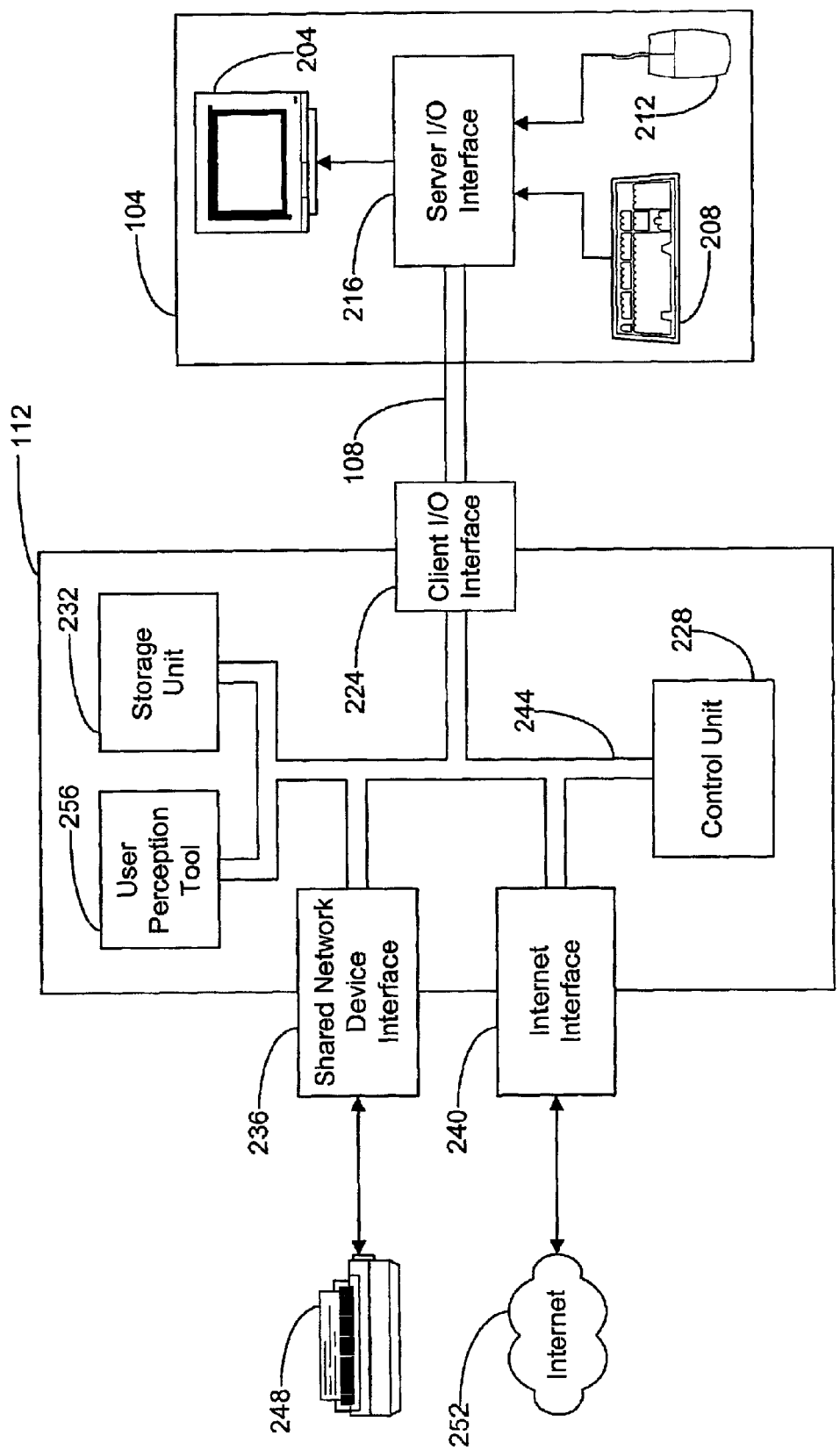
FIG. 2 illustrates an alternate block diagram of the computer system of FIG. 1, programmed and operated in accordance with one embodiment of the present invention.

Turning now to FIG. 2, an alternate embodiment of the client-server system 100 of FIG. 1, in accordance with one embodiment of the present invention, is illustrated. The client computer 104 comprises the one or more output devices, such as a monitor 204, the one or more input devices, such as a keyboard 208 and mouse 212, and a server input/output ("I/O") interface 216, which facilitates communication between the client computer 104 and the server computer 112. The output devices and the input devices are coupled to the server I/O interface 216. The server I/O interface 216 communicates with the server computer 112 via the local area network ("LAN") 108. The LAN 108 may comprise any of a variety of LANs, in accordance with conventional practice. Those skilled in the art will recognize that LANs may differ in a variety of ways, including topology, protocols, and media (e.g., twisted-pair wire, coaxial cables, fiber optic cables, radio waves). For the sake of simplicity, only one client computer 104 is shown in FIG. 2. However, it should be appreciated that a plurality of the client computers 104 may be coupled to the LAN 108.

Like the server I/O interface 216, a client input/output ("I/O") interface 224 coordinates communications with the server computer 112 via the LAN 108. The server computer 112 comprises a control unit 228, a storage unit 232, a shared network device interface 236, and an Internet interface 240. The client I/O interface 224, the control unit 228, the storage unit 232, the shared network device interface 236, and the Internet interface 240 communicate with each other via a system bus 244. The server computer 112 may include one or more control units 228. The control unit 228 may be a microprocessor, a microcontroller, a digital signal processor, a processor card (including one or more microprocessors or controllers), or other control or computing devices. One example of a control unit 228 for the server computer 112 is the UltraSPARC® processor.

The server computer 112 may include one or more storage units 232. The storage unit 232 may include one or more machine-readable storage media for storing information. The storage media may include different forms of memory including semiconductor memory devices such as dynamic or static random access memories (DRAMs or SRAMs), erasable and programmable read-only memories (EPROMs), electrically erasable and programmable read-only memories (EEPROMs), flash memories, and the like; magnetic disks such as fixed, floppy, removable disks; other magnetic media including tape; and optical media such as compact disks (CDs) or digital video disks (DVDs). The storage unit 232 may comprise a variety of applications, including a basic input/output system ("BIOS") and an operating system ("OS"). In one embodiment, the BIOS comprises basic routines that control various components of the server computer 112, such as the control unit 228 and the storage unit 232. The OS is generally the main control program of the server computer 112. Among other things, the OS may schedule tasks and handle communication with peripherals. An exemplary OS for the server system is the Solaris® Operating Environment.

The server computer 112 includes an Internet interface 240, which is coupled to the Internet 252 and is capable of accessing the world wide web ("WWW"). The Internet interface 240 is typically a modem or a network connection, such as an Ethernet connection. The Internet interface 240 may further comprise a firewall or other security measure. The firewall is generally a system designed to prevent unauthorized access to and from a network. All communications to and from the server computer 112 may pass through the firewall, which examines each communication and blocks those that do not meet the specified security criteria (e.g., a possibly malicious Trojan horse).

The server computer 112 may include one or more shared network device interfaces 236. Each shared network device interface 236 is coupled to one or more shared network devices 116 of FIG. 1, such as a printer 248. Users on the client computers 104 may have access to the shared network devices 116 on the server computer 112 via the shared network device interface 236. In one embodiment, the shared network device interface 236 may comprise one or more device drivers for accessing the shared network devices 116. In another embodiment, the shared network device 116 itself may provide the necessary device drivers, typically in a nonvolatile memory embedded in the shared network device 116.

The server computer 112 includes a user perception tool 256. As described in greater detail below, the user perception tool 256 provides a method for measuring the latency of server systems 112, and, in one embodiment, compares the latency with data collected about a user's perception of tolerable performance. The user perception tool 256 may be a program stored in the storage unit 232 or it may be a separate device connected peripherally to the server computer 112. For the sake of simplicity, it will be assumed for the remainder of this disclosure that the user perception tool 256 is a program executed by the control unit 228. The user perception tool 256 may be executed in conjunction with an operating system ("OS").

As mentioned, the user perception tool 256 may be a program that records the time a particular event takes to complete. The event typically involves some type of user interaction where a user enters a command on the client computer 104 and the server computer 112 responds to the command by providing output to the client computer 104. The user perception tool 256 may measure the time between the response to the command and when the user entered the command. The event may involve any function of the OS or any other application executed by the control unit 228 of the server computer 112. Exemplary events that may be measured by the user perception tool 256 include keystrokes and mouse movements. In one embodiment, the event being timed by the user perception tool 256 is an expose event of the OS.

Most applications being developed today utilize, at least in part, a graphical user interface ("GUI"). The GUI has emerged as a common interface of a plurality of software on the market today. One advantage of the GUI-based application from non-graphical ones is that the GUI provides a more user-friendly environment for users of the application (as compared to text-based and menu-based applications). GUI applications are generally applications that display pictures as well as words. Instead of entering commands in text or following cumbersome text-based menus, users may perform commands on the GUI applications by clicking on icons and other pictorial representations of tasks. Exemplary applications using the GUI include windows-based operating systems, such as Microsoft Windows®, Apple Mac OS®, and Solaris®.

Windows-based operating systems generally separate functionality of the OS from its graphical components (e.g., drawing windows). This means that an application written to execute on the windows-based operating system may be required to provide, for example, separate commands for generating output and for displaying the output on a monitor 204. Among the drawing commands available in a plurality of windows-based operating systems is the expose event. In one embodiment, the expose event informs the application that all or a portion of one or more of its windows needs to be drawn. This can occur because the window just became visible for the first time, because the window was previously obscured by another application and that application has just terminated or had its windows moved, or because the window was resized. When a window is initialized (i.e., when a window first appears), the windows-based operating system will usually send an expose event to the application, instructing the application to draw the window. In one embodiment, the expose event completes when the window is drawn on the monitor 204.

Figure 3:
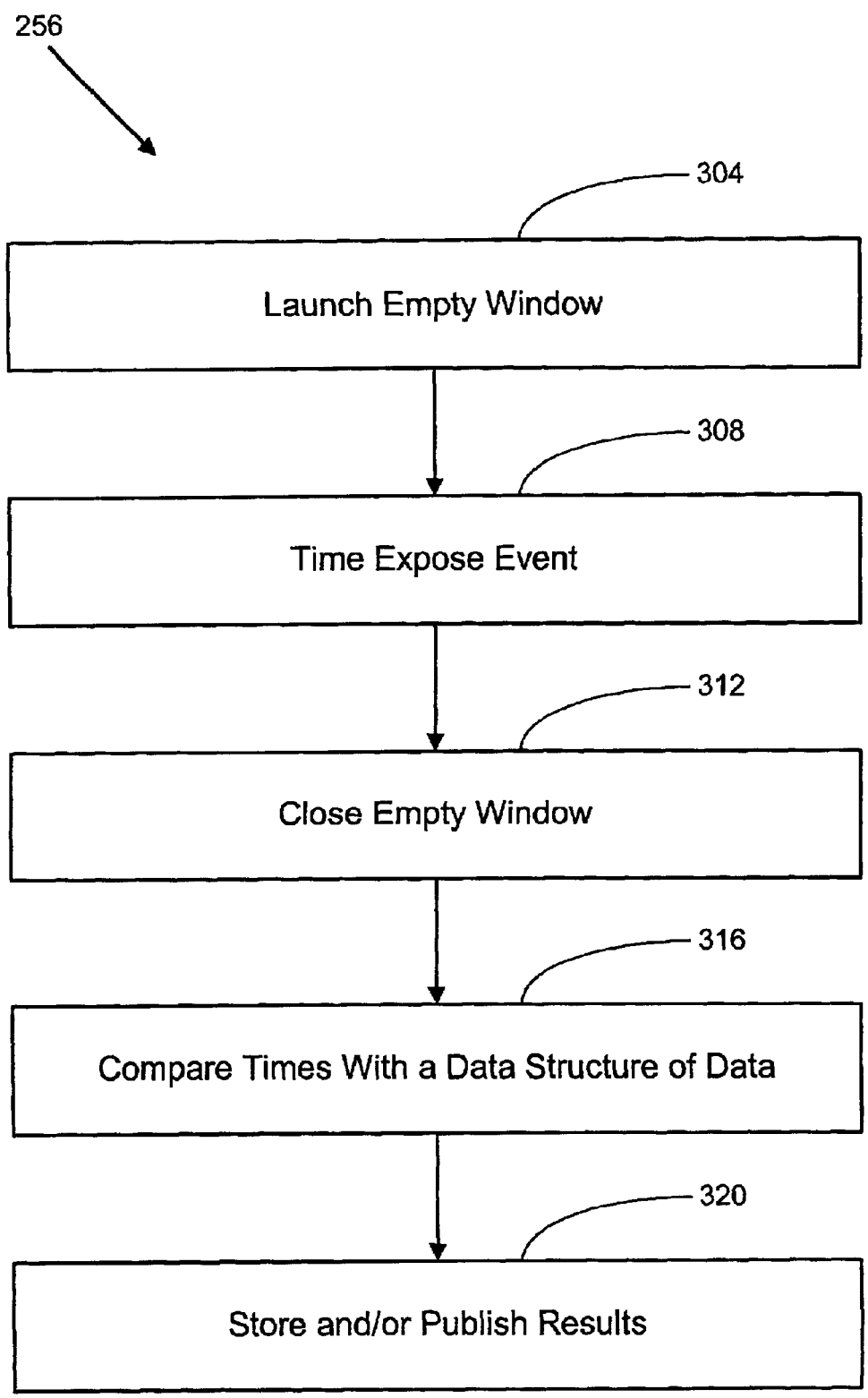
FIG. 3 illustrates a flow diagram of a user perception tool utilized by the computer systems of FIGS. 1 and 2, in accordance with one embodiment of the present invention.

Turning now to FIG. 3, a flow diagram illustrating one embodiment of the user perception tool 256, in accordance with one embodiment of the present invention, is shown. The user perception tool 256 launches (at 304) an empty window. In one embodiment, launching the empty window commences an expose event. The user perception tool 256 times (at 308) the expose event. In one embodiment, the expose event completes when the user perception tool 256 draws the window on a monitor 204. The user perception tool 256, in other words, records the amount of time taken to draw the window on the monitor 204. The user perception tool 256 closes (at 312) the empty window. The user perception tool 256 compares (at 316) the time recorded from the expose event with a data structure of data previously collected from various users. Although not so limited, the term "data structure" may include a database. In one embodiment, the data structure of data is collected from surveys that gather human tolerance of performance on the server computer 112 at various loads. By comparing the time recorded from the expose event with the data structure of data previously collected, the user perception tool 256 may determine whether the server computer 112 is running at a user-tolerable performance level. In another embodiment of the present invention, the data structure of data may be gathered to determine a setpoint. The setpoint may comprise a value that represents a threshold time where the user perceives the system performance to be unacceptable. The time recorded from the expose event may then be compared (at 316) with the setpoint. It should be appreciated that the terms "perception" and "tolerance" may be used interchangeably through the remainder of this disclosure.

The results of the comparison may be stored (at 320) in the storage unit 232 or it may be published for the user, such as displaying the results on the monitor 204. A system administrator, for example, may use the results for making adjustments to the server computer 112 for increasing performance, in accordance with conventional practice. For example, the system administrator may increase hardware, such as adding one or more processors to the server computer 112. The system administrator may also decrease the number of users on a particular server computer 112, thereby decreasing the load on the server computer 112. In one embodiment of the present invention, the user perception tool 256 may issue an indication (e.g., a warning) regarding system performance in conjunction with storing (at 320) or publishing the results.

The data structure of data, as mentioned, may comprise survey data concerning human perception of performance. In one embodiment, an experiment may be done for collecting data concerning human tolerance of performance of a client computer 104 with a particular load on the server computer 112. Users may be presented with loaded systems and asked to rate on a sliding scale whether they find various parameters of the server computer 112 to be acceptable or unacceptable, in accordance with the users' opinions. Exemplary parameters that may be measured in the survey include, but are not limited to: whether a screen updated at an acceptable speed; whether keystroke and mouse responses were acceptable, whether uniform resource locator ("URL") delays were acceptable; whether window focus times were acceptable; whether the client computer 104 performance is comparable to the performance to the user's desktop; and whether the client computer 104, with the particular load on the server computer 112, would be useful for a particular task, such as web browsing. Users may also be presented with loaded systems and asked to rate on a sliding scale whether they find latency in the system's response to user input, such as keystrokes, mouse responses, and window movements, acceptable.

The scores from the survey may be averaged over all the parameters and correlated with the particular loads. From the scores of the survey, a maximum latency time that a user may find tolerable can be determined. A system administrator may compare the results obtained from executing the user perception tool 256 with the maximum latency time to infer a variety of information concerning system performance. For example, the system administrator may identify the maximum load that the server computer 112 under test can bear before users perceive the performance to be poor. The system administrator may also use this information on a server computer 112 in actual use to give a warning of when users may perceive the system performance to be poor or on a server computer 112 with a modeled load for aiding in sizing of the system.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method of measuring performance of a desktop computer network system, the method comprising:

receiving a user action on a thin client;

sending a request for a process of the user action from the thin client to a server via a network;

processing the user action at the server;

providing the processed user action to the thin client via the network;

displaying a result of the processed user action on the thin client;

timing the receiving, sending, processing, providing, and displaying steps to create a time;

generating a data structure of data, the generating the data structure of data comprises generating a first setpoint; and comparing the time of the receiving, sending, processing, providing, and displaying steps with the data structure of data to create results of the computer system performance, wherein comparing the time with the data structure of data to create results of the computer network system performance comprises comparing the time of the receiving, sending, processing, providing, and displaying steps with the first setpoint and producing an indication of undesirable performance in response to the time of the steps being greater than the first setpoint.

2. The method of claim 1, wherein generating the data structure of data comprises determining a maximum time such that a user of the thin client perceives the performance of the computer network system to be tolerable.

3. The method of claim 1, wherein comparing the time with the data structure of data to create results of the computer network system performance comprises determining whether the time of the receiving, sending, processing, providing, and displaying steps is tolerable to a user of the thin client.

4. The method of claim 1, wherein comparing the time with the data structure of data to create results of the computer network system performance comprises storing the results on a storage unit of the server.

5. The method of claim 1, wherein comparing the time with the data structure of data to create results of the computer network system performance comprises sending the results to a control unit of the server.

6. The method of claim 1, wherein the data structure is generated from human surveys.

7. The method of claim 1, wherein the time of the steps comprises the amount of time needed to open an empty window on the thin client.

8. An article comprising one or more machine-readable storage media containing instructions that, when executed, enable a processor on a server of a computer network system to:

time a first part of an event on receiving a user action on a thin client;

time a second part of the event on sending a request for a process of the user action from the thin client to the server via a network;

time a third part of the event on processing the user action at the server;

time a fourth part of the event on providing the processed user action to the thin client via the network;

time a fifth part of the event on displaying a result of the processed user action on the thin client;

generate a data structure of data; and compare the time of the first, second, third, fourth, and fifth parts of the event with the data structure of data to create results of the computer network system performance;

wherein the instructions, when executed, enable the processor to determine a maximum time such that a user of the thin client perceives the performance to be tolerable and to generate a first setpoint based on the maximum time and enable the processor to compare the time of the event with the first setpoint and to produce an indication of undesirable performance in response to the time of the event being greater than the first setpoint.

9. The article of claim 8, wherein the thin client provides desktop interface services to a user and wherein the server provides desktop computational services to the user through the thin client via the network.

10. The article of claim 8, wherein the network is a local area network (LAN).

11. The article of claim 8, wherein the instructions, when executed, enable the processor to gather survey data about user perception of performance on the computer network system with various loads.

12. The article of claim 8, wherein the instructions, when executed, enable the processor to determine whether the time of the first, second, third, fourth, and fifth parts of the event is tolerable to a user of the thin client.

13. The article of claim 8, wherein the instructions, when executed, enable the processor to present the indication of undesirable performance to a control unit of the server.

14. The article of claim 8, wherein the data structure is generated from human surveys.

15. The article of claim 8, wherein the time of the first, second, third, fourth, and fifth parts of the event records the amount of time needed to open an empty window on the thin client.

* * * * *